J. R. PEIRCE.
MAKING DEEP CUTS IN MARBLE OR SIMILAR STONE.
APPLICATION FILED NOV. 9, 1909.
1,063,380.
Patented June 3, 1913.
4 SHEETS—SHEET 1.
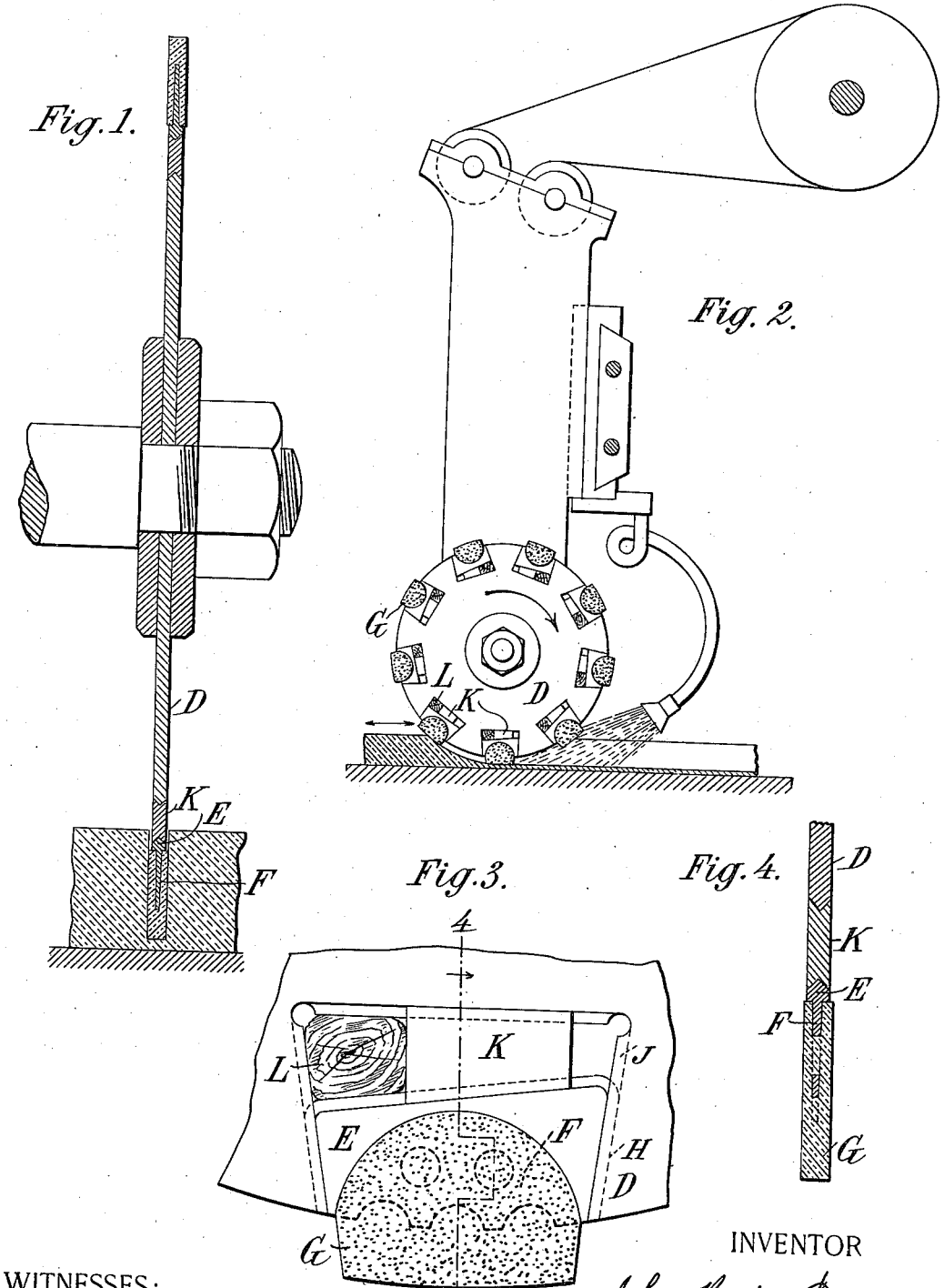

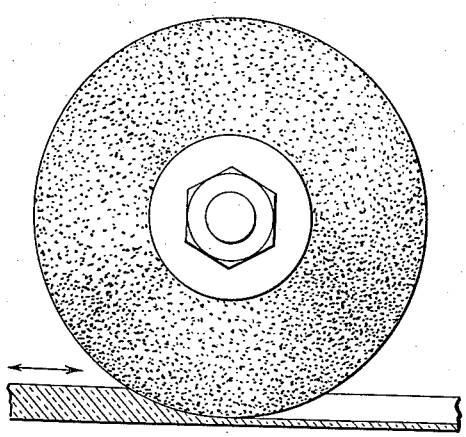
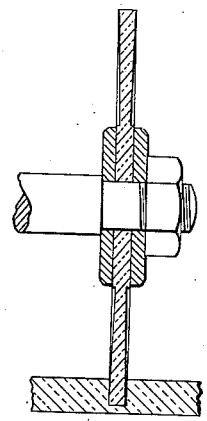
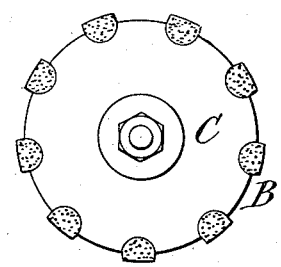
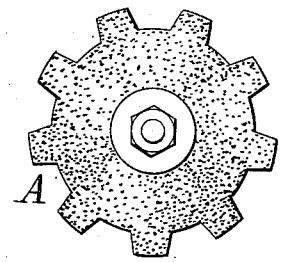
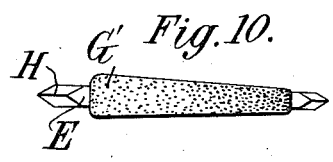
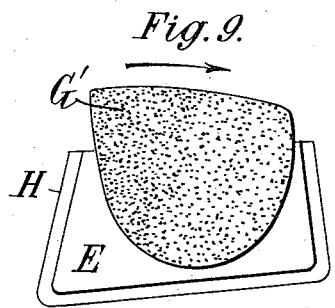
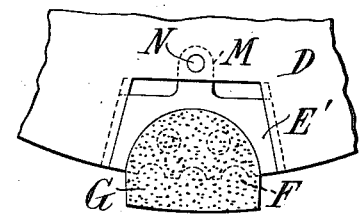

J. R. PEIRCE.
MAKING DEEP CUTS IN MARBLE OR SIMILAR STONE.
APPLICATION FILED NOV. 9, 1909.
1,063,380.
Patented June 3, 1913.
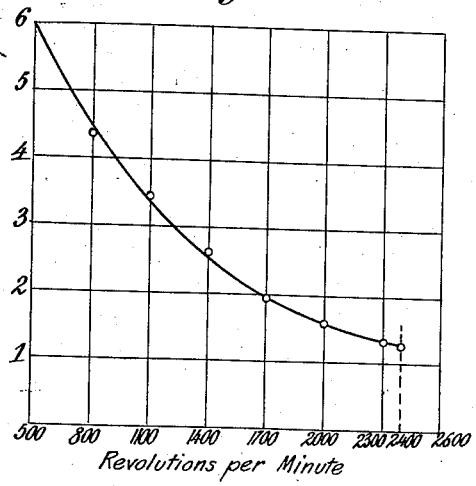
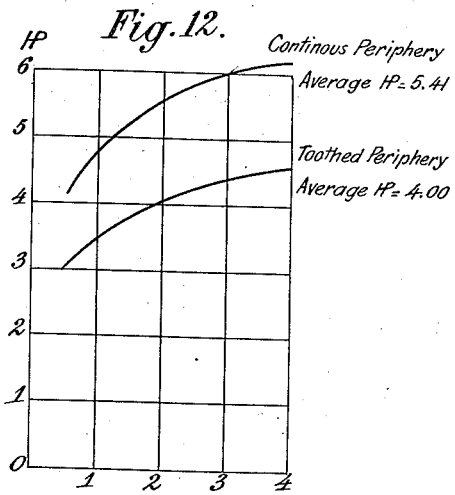
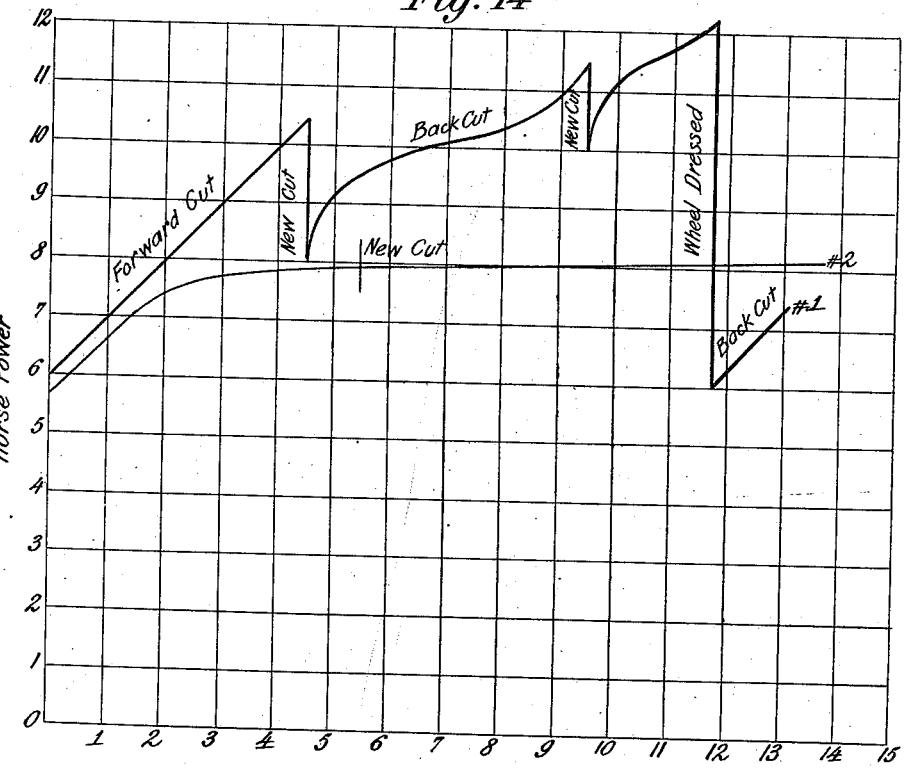

J. R. PEIRCE.
MAKING DEEP CUTS IN MARBLE OR SIMILAR STONE.
APPLICATION FILED NOV. 9, 1909.
1,063,380.
Patented June 3, 1913.
4 SHEETS—SHEET 4.
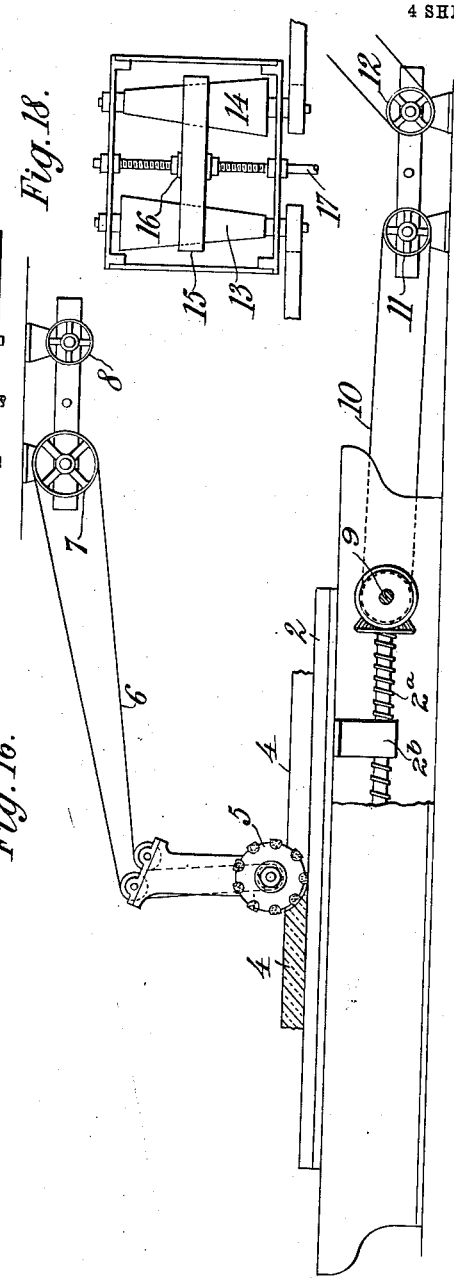
INVENTOR:
John Hoyden Peirce,
By Attorneys,
WITNESSES:

UNITED STATES PATENT OFFICE.

JOHN ROYDEN PEIRCE, OF NEW YORK, N. Y., ASSIGNOR TO ROYDEN MARBLE MACHINERY COMPANY, OF NEW YORK, N. Y., A CORPORATION OF NEW JERSEY.

MAKING DEEP CUTS IN MARBLE OR SIMILAR STONE.

1,063,380.  Specification of Letters Patent.  Patented June 3, 1913.

Application filed November 9, 1909. Serial No. 527,081.

*To all whom it may concern:*

Be it known that I, JOHN ROYDEN PEIRCE, a citizen of the United States, residing in the borough of Manhattan, city, county, and State of New York, have invented certain new and useful Improvements in Making Deep Cuts in Marble or Similar Stone, of which the following is a specification.

This invention aims to provide certain improvements in processes for making deep cuts (as distinguished from shallow surfacing operations) in marbles or the like, such as "soft" stone generally, including limestone and onyx,—but not in granites and sandstones,—by means of carborundum or similar hard, sharp, crystalline abradants.

The invention is the outgrowth of extensive experimentation, and of the discovery that in the making of deep cuts in marble or the like, those conditions of rotation of the cutting wheel are most favorable which depart as far as possible from the established method of using abradants; that the extent of the possible departure from established methods is greater with a toothed wheel than with a wheel having a continuous periphery; and that the efficiency is increased by certain other points referred to hereinafter in detail.

The invention will be explained specifically with reference to the accompanying drawings illustrating suitable apparatus for carrying out the process and will be defined in the claims hereinafter.

Figures 1 and 2 are respectively a transverse and a longitudinal vertical section, showing a wheel of steel with inserted teeth cutting through a slab or block. Figs. 3 and 4 are respectively a side elevation of a single tooth, and a section through the line 4—4 of Fig. 3. Figs. 5 and 6 are views similar to Figs. 1 and 2 illustrating the process as applied to a solid carborundrum wheel. Figs. 7 and 8 are face elevations of other styles of cutter, the former showing separate teeth molded on the edge of the steel plate, and the latter showing integral teeth cut in the edge of a solid carborundum wheel. Figs. 9 and 10 are respectively a plan and a face elevation of another shape of tooth. Figs. 11 and 12 are diagrams illustrating certain tests. Fig. 13 is a section of a carborundum wheel with rubber bond after use. Fig. 14 is a diagram illustrating certain tests. Fig. 15 is a face elevation of another style of tooth. Fig. 16 is a side elevation of the principal elements of a complete machine. Figs. 17 and 18 are plans of parts thereof.

In abrasive work it is generally regarded as advantageous to rotate the abrading wheel as rapidly as its strength will permit without its being disrupted by centrifugal force. It is roughly assumed that a mile a minute of peripheral speed is about right for most wheels, and in my previous patents above referred to, and in the work which has been done with the apparatus of said patents, it has generally been assumed that the wheels should be rotated at this speed, or faster if possible. In my further experiments, however, I have discovered the extraordinary fact that for making deep cuts in marble or the like for any given rate of feed of the marble to the wheel, the slower the rotation of the wheel the more efficient, subject to certain limitations hereinafter referred to. Or conversely, for a given consumption of horse power, the slower the rotation of the wheel the more rapid can be the feed of the slab to the wheel. Fig. 11, for example, shows the rapid increase in the quantity of marble removed with a constant horse power, at different rates of revolution of the wheel, varying from one and a quarter cubic inches of marble per minute removed at 2400 revolutions, to six cubic inches per minute removed at 500 revolutions. This advantage is probably due in large part to the fact that in rotating more slowly the wheel takes out the marble in larger particles and that the resistance of these larger particles to being detached from the body of the marble, does not put as much work upon the wheel as would be involved in the finer grinding of the particles which would result from a higher rate of rotation. The advantage may also be due in part or in whole to other reasons at present unknown to me.

The taking out of large particles of marble is assisted by using a wheel with a toothed or broken periphery, for two principal reasons. First, the area of a toothed wheel in contact with the marble is less than if its periphery were continuous, and for a given total pressure it penetrates more deeply into the marble. Second, its clogging limit is lower because of the spaces between the teeth receiving a quantity of the particles of marble removed without interfering with the operation of the cutting edge. In order to make as good a comparison as possible between a continuous periphery wheel and a toothed wheel, I tested the continuous wheel first and then cut teeth in its edge, leaving half the circumference as a cutting surface. Fig. 12 is a diagram showing the curves of horse power at the ends of the first, second, third and fourth minutes of the test. The wheels were 14 inches diameter, one-quarter inch thick, number 24 grit, rubber bond, and were rotated at 1000 revolutions per minute. The work was a cut 1¾ inches deep in Tennessee marble with a feed of 15 inches per minute. The toothing of the periphery saved 26 per cent. of the horse power involved in the use of the wheel with a continuous periphery.

An important consideration, and which affords a minimum limit for the rate of rotation of the wheel, is the clogging of the cutting surface of the wheel with particles of marble. I have observed that the particles of carborundum do not all project in isolated fashion from their matrix leaving free spaces around each particle, but some or all of them form irregular closed pockets of different size and number, depending upon the coarseness of the carborundum and the nature of the bond. If the rotation of the wheel is slow enough these pockets become filled with wet marble dust which packs in them and remains there, filling the pockets to approximately the line of the ends of the cutting particles and seriously reducing the efficiency. The wheel must therefore be revolved with sufficient rapidity to avoid this clogging. With a continuous wheel I have observed that the pockets referred to will carry a thickness of abraded marble equal to about one one-thousandth of an inch. A toothed wheel however, will carry twice the quantity corresponding to that thickness, the additional quantity of the marble dust being apparently carried into the spaces between the teeth either by being shoved forward by the teeth, or by being dragged back into the recesses at the rear of the teeth. As the greatest efficiency is obtained by revolving at a minimum rate, determined by the clogging limit, and as the clogging limit of a toothed wheel is reached at a lower rate of peripheral engagement with the marble than in the case of a continuous wheel, the engagement of a toothed wheel can be effected at a much lower rate than that of a continuous wheel, and the toothed wheel can consequently attain a much higher efficiency.

In calculating the relation of the clogging limit to the rate of peripheral engagement of the wheel with the marble, the toothed wheel is calculated on a basis of its actual cutting periphery, one-half that of a continuous wheel of the same diameter in most of my experiments herein referred to. Even though the cutting periphery of the toothed wheel be only one-half that of a continuous wheel of the same diameter, the former can be given an actual rotation slower than that of the continuous wheel (making its rate of peripheral engagement with the marble less than half that of the continuous wheel), while remaining within the clogging limit.

Concerning the clogging limit, it is to be observed that when the pockets in the periphery of the wheel are filled with abraded marble, the portion of the wheel within the cuts must be brought out so that the pockets may be emptied and refilled when again meeting the marble. The pockets empty by reason of the centrifugal force and the water thrown on the wheel. If the wheel is revolved too rapidly, the pockets are only partly filled and the wheel is not doing its maximum work (its lack of efficiency being probably due also to the unnecessarily fine grinding of the particles as explained above). If the wheel is revolved too slowly the pockets are not only filled, but become packed or congested with the abraded marble, and therefore create friction between the marble being cut and that already abraded. Also the pockets do not properly empty themselves after having become packed. This theory is confirmed by the fact that below a certain speed of revolution the periphery of the wheel becomes whitened with the abraded marble, and remains so notwithstanding the centrifugal force and the copious use of water.

The clogging limit of the rate of revolution is not the same for all rates of feed of the marble to the wheel. If the marble is fed faster the wheel can rotate faster without reducing the size of the particles of marble which the wheel removes, and the clogging limit or its rate of revolution is higher because of the faster supply of marble to the wheel. This increase in speed is accompanied by an increase in the consumption of power. For example, assuming that the clogging limit of the wheel is 600 revolutions per minute when cutting a slab two inches thick at a feed of one foot per minute, and that it requires 2 H. P. to drive it, an increase to a feed of two feet per minute will require a proportionate increase in horse power and the clogging limit of the wheel will be 1200 revolutions per minute. The efficiency of the wheel, the ratio of the work done to the horse power expended, remains the same. The speed of feeding the marble is only limited by the pressure which the wheel or the marble will stand. In hard, compact marble like Champlain, the teeth of the wheel would probably break before the marble, whereas in colored marble, Rouge Jasper for instance, the marble would probably break before the wheel. To get the best use of a machine therefore (in the light of the above considerations), the marble should be fed at a maximum rate limited by the strength of the marble and that of the wheel, and the wheel should then be rotated at a minimum rate limited by the clogging of the wheel with the particles of marble removed. Figs. 16, 17 and 18 show a suitable means for securing the desired regulation of the speed of rotation of the wheel to a minimum, and of the feed of the marble to a maximum. The machine is of a known planer type (described fully in my Letters Patent, No. 862,933 of Aug. 13, '07) having a bed 2 which reciprocates on a fixed base 3 and carries a slab 4 of marble, while the cutting wheel which is indicated as a whole by the numeral 5 is carried in stationary bearings and is rotated at a high speed by means of a belt 6 running over a pulley 7, which is driven from another pulley 8.

The bed 2 of the machine is reciprocated by means of a worm shaft $2^a$ engaging a nut $2^b$ on the underside of the bed and driven from a cross-shaft 9 near one end of the base of the machine which in turn is driven by a belt 10 from a pulley 11, which pulley is driven from a pulley 12. Between the driving and driven pulleys 8 and 7 for rotating the wheel and the corresponding pulleys 12 and 11 for feeding the marble, there are interposed speed regulating mechanisms of a known type, such as are shown in Figs. 17 and 18 comprising a pair of cones 13 14 arranged alongside of each other and tapering in opposite directions, connected by means of a belt 15 which is shifted by means of a shifter 16 which is traversed in a direction parallel with the axes of the cones by means of a shaft 17 having screw threads engaging the belt shifter and having its end adapted for rotation by hand. This style of speed-changing gear gives a very nice graduation so as to permit the regulation of the machine for the very highest efficiency.

Wheels with inserted teeth are shown by my experiments to stand a much higher pressure and consequently a more rapid feed of the marble than any of the other practicable types. Solid wheels made up with elastic bonds are not practicable unless the bond is made quite hard, and solid wheels with vitrified or hard rubber bonds will not stand a very high pressure without being crushed. A rubber bond may, however, be advantageously used for inserted teeth since there is only a slight portion of the bonded carborundum which is not backed by steel sufficiently stiff to prevent its bending, and since the slight projecting portion of unsupported carborundum cannot yield to anything like the extent to which a wheel made up entirely of carborundum with such a soft bond, would yield. A rubber bond is also particularly adapted for a toothed wheel, because the spaces between the teeth secure a better circulation of water and permit the taking of deeper cuts than would be possible with a continuous wheel. In attempting to use a continuous wheel made up with a rubber bond for taking deep cuts, the rubber burned with a very decided odor and caused a rapid glazing of the wheel and an increase of horse power, due probably to the preventing of good penetration of the carborundum particles into the marble. Another objection to the use of a rubber bond for a continuous wheel which does not apply to any material extent when the wheel is toothed, lies in the fact that the periphery of the rubber bonded wheel is much less porous than that of the vitrified wheel, and retards the circulation of water to a greater extent. This is shown by the burning of a groove in the center of the periphery of a continuous rubber wheel, where the water cannot have access to it. Fig. 13 is a cross-section of a portion of such a wheel after a short period of use, the cutting face being indicated at A'. If the wheel is made up of a soft rubber bond, the bond wears away rapidly and allows the particles to project more from its periphery. While this extends the clogging limit it makes the wheel more elastic and increases the tendency to cut out of true above referred to. If it were not for these difficulties a rubber bond might be better for all kinds of wheel than a vitrified bond; and I have invented an inserted-tooth wheel in which the difficulties due to the rubber bond are substantially eliminated while its advantages are retained. The inserted tooth wheel, although I have subjected it to the most severe tests, does not appear to be in the slightest danger of breaking; and although the teeth which I have used are made up with a rubber bond so soft as to provide a good projection of the particles and a low clogging limit, there are none of the difficulties which arise in the use of a continuous wheel with a rubber bond, the teeth are so firmly supported by the steel that the wheel will absolutely not cut out of true, and I have forced it through marbles of different thicknesses at a much greater speed than has been possible with any other carborundum wheels. A further advantage of the slow rate of rotation of these toothed wheels is in the infrequency with which the wheel needs to be dressed. This is important, since the teeth extend only a slight distance (a half inch, for example) beyond the periphery of the steel blade. The variation in diameter from the time of first using the wheel until the carborundum is used up, is so slight as to secure a peripheral speed which is approximately constant. Probably the advantages of reducing the rate of rotation and toothing the edge of the wheel depend upon the capability of penetration which carborundum has in marble. With a toothed wheel of the character above described in practical use, I have coped Tennessee marble slabs 2½ inches thick at a speed of 16 linear inches per minute, revolving the wheel at 800 revolutions per minute, and using less than 3 H. P. to drive it. The clogging limit was not reached, although it was probably approached by this rate of revolution. A solid vitrified wheel running through the same kind and thickness of marble and at the same rate of feed, reached its clogging limit at abut 1000 revolutions per minute, and required about 8 H. P. to drive it.

A comparison of the clogging factors after a number of tests to determine the advantage of toothing and of a rubber bond, gave the following comparative factors:

| | |
|---|---|
| Continuous rubber wheel | 78 |
| Toothed rubber wheel | 194 |
| Continuous vitrified wheel | 83 |
| Toothed vitrified wheel | 94 |

This table indicates clearly the advantage of making the wheel toothed, and the especial advantage of doing so with a rubber bond. The clogging factor is believed to be a physical constant for every wheel. The above experiments were made with a 40-grit vitrified wheel and a 20-grit rubber wheel, these being common sizes, and the rubber composition being the same as used in the inserted-tooth wheels above referred to. The vitrified wheel was 10 inches, and the rubber wheel 12 inches in diameter. These wheels were first tried with continuous circumferences, after which notches were cut in the periphery in the manner indicated in Fig. 8, for example. They were both run at the same peripheral velocity, cutting substantially through a slab of 1½ inch Tennessee marble. The feed of the marble was increased until the surface of the wheel became white. The tests were repeated a great many times and while the clogging factor appeared to be a very definite thing, it is difficult to accurately determine. The factor sought was X in the following equation, in which S equals the square inches of cutting surface on the periphery and R. P. M. equals the revolutions per minute; S×R. P. M.×X=number of cubic inches removed.

The quantities shown in the table above represent ten-thousandths of an inch. For the process of this invention, therefore, it is important that the teeth of the wheel be made with a bond of rubber or equivalent dense, elastic material.

The rapidity with which the solid wheel glazes and runs up the horse power, and the very gradual increase in horse power after the first few minutes of use of the toothed wheel, are shown in the diagram of Fig. 14. The curve numbered 1 is for a 14-inch rubber wheel, and that numbered 2 is for an inserted tooth wheel of the same diameter. Both were tested for a seven-eighths inch cut in Italian marble. The ratio between the speed of rotation (X) of the wheel in revolutions per minute, and the speed of feed (Y) of the marble in cubic inches per minute for a solid 12-inch vitrified wheel, with an expenditure of 3.75 H. P., follows approximately a logarithmic curve, and is expressed by the following equation determined from experiment:

$$\text{Log. } Y = 0.775 - 0.1157X.$$

In previous work with the machines described in my above mentioned patents, ordinary speeds for abrasive work were used, varying say from 1500 to 2500 revolutions per minute for a 12-inch wheel (4500 to 8000 linear feet per minute). The extent to which the feed might be accelerated by decreasing the speed of rotation for a constant horse power, is not so marked within these limits, and there was no reason to suppose that such a result would occur. Below a peripheral velocity of about 4500 feet per minute however, the feed of cutting increases more rapidly as shown by the curve in Fig. 11. In accordance with this discovery the machines may be worked at their greatest efficiency by decreasing the speed of rotation of the wheel to correspond with the desired rate of feed of the marble, or by increasing the rate of feed to correspond with a desired rate of rotation; and either or both of these steps may be carried forward until the coping wheel or the marble yields. To get the greatest efficiency the speed of rotation should be reduced or the feeding of the marble should be accelerated until the clogging limit is reached. This limit is observable by the whitening of the periphery of the wheel owing to its being congested with abraded marble, and by the increased expenditure of horse power noted on the watt meter or other testing instrument used. The clogging increases the horse power as above explained, and has much the same effect as the glazing of the wheel would have.

The degree of fineness of the carborundum is of more importance in a toothed wheel than in a continuous wheel, because there is in a toothed wheel a more noticeable tendency to injure the arris left on the marble where the cutting portion of the wheel emerges upward from the face of the slab. There is a tendency in this case for the wheel to lift the sides of the cut and so make an imperfect arris, necessitating the smoothing of the edges on the rubbing bed, and depriving the process of one of its great advantages over diamond saws and the like; and this tendency is more noticeable with a coarse grade of carborundum than with a fine grade. As coarse a grade will be used as possible, having regard for the excellence of the arris, since increasing the coarseness increases the efficiency in a toothed wheel as well as in a continuous wheel. I have found a coarseness of from 20 to 40 grit suitable for most cases. The same principles here referred to in connection with circular cutters, are also of value in reciprocating cutters in so far as the same conditions apply.

I have made experiments with a number of different sizes of teeth, and with wheels having various numbers of teeth in their peripheries, making the cutting portion generally one-half of the entire periphery. There is no marked difference in horse power effected by varying the lengths of the teeth, but in some tests there seemed to be a slight advantage in deep cuts in the use of small teeth. The horse power, however, apparently depends only upon the proportion of the rim which is cutting surface. The less cutting surface, the smaller the number of particles to be pressed into the marble, and the smaller the horse power. But there are practical objections to too few teeth, and also to too many teeth. When the teeth are too few the space between them is too large, and the fronts of the teeth get an undue amount of wear. This has the effect of nosing or tapering their forward portions, both radially and laterally somewhat in the manner shown in Figs. 9 and 10, but to a greater extent. As soon as the front of the tooth begins to wear, more work is thrown upon the rear, and if the number of teeth is too small they wear down too rapidly. On the other hand, the making of the wheels with a great many teeth adds materially to the cost, and lessens the amount of metal uncut between the teeth for supporting them. Preferably in a 14-inch diameter wheel from 9 to 14 teeth are used, of lengths constituting one-half the periphery. Where the marble is not too hard and the nosing is not too great, a nine-toothed wheel is preferred as more economical; and in harder marbles a fourteen-toothed wheel. In wheels for limestone the teeth are preferably larger than in those for marble. Also for cutting limestone, the tooth requires a very strong bond because the limestone wears the tooth down rapidly.

The teeth may be formed integrally as shown at A in Fig. 8, or they may be molded upon thinned web portions of the steel disk C as shown at B in Fig. 7; preferably, however, they are separately formed and fastened in notches in the edge of the disk or plate D, as shown in Figs. 1, 2, 3, 4 and 15. The teeth extend from a half to three-quarters of an inch beyond the periphery of the steel blade, and must be accurately centered laterally, firmly held and easily replaced. These conditions are very difficult to secure with a tooth made solidly of carborundum, whether of vitrified, rubber or shellac or other bond, and fitted directly in the notch in the edge of the blade. They are subjected to strong tangential and radial strains, when operating the wheel at a low speed and feeding the marble rapidly. If there is the least displacement of the teeth laterally, the shocks which they receive when entering the marble break them very readily, although they may be of considerable hardness. The difficulty is avoided by using a steel form upon which the carborundum is molded, cast, or otherwise formed, and for this purpose the rubber bond is superior to the others. It can be molded very accurately and its steel form can be accurately centered in the blade, the edges of steel on steel being capable of most accurate fitting. It is important also to avoid any loosening of the teeth such as occurs with riveted constructions, and therefore I propose to use a wedge with expanding means for pressing the tooth always to its position. A further objection to such inaccuracies as occur with teeth made entirely of carborundum, is that the lateral displacements though they be only two one-hundredths of an inch, tend to seriously impair the arris of the marble. With teeth of a rubber bond molded on a steel backing the arris is practically as good as that left by a solid carborundum wheel; that is to say, there is no necessity for subsequently grinding down the cut faces on the rubbing bed. For this purpose I have invented the construction shown.

The tooth is composed of a back E of steel having at its edge an approximately semi-circular web F of considerably less thickness than the body of the tooth, and which is perforated and notched as shown; and a cutting portion G of carborundum molded upon the web F of the backing and held by its frictional adhesion and by the passage of the material through the holes and notches of the web. It is also given additional support by the portions of the backing extending down along the sides of the carborundum, and in this respect is superior to a rim of carborundum molded continuously around the edge of the blade. The cutting portion G of the tooth can be molded very accurately with a rubber bond, and after all the teeth are set in place they can be dressed to bring the wheel to a true circular shape.

A suitable method of bonding the carborundum is as follows: Carborundum, rubber and sulfur are mixed in the following proportions, namely, 86 per cent. of the first, 10½ per cent. of the second and 3½ per cent. of the third. The mixture is then heated and pressed in a mold about the web, after which it is vulcanized in the ordinary way. The backing E of each tooth is made with projecting edges H which fit into corresponding grooves J in the edges of the notches, and the notches and teeth are made to taper toward their outer ends so that by pressing a tooth outward it is wedged firmly in place. The outward pressure is effected by means of a small wedge K driven in a suitable space between the inner edge of the backing E and a corresponding edge of the notch. The wedge K may be held and pressed in place by an expanding member L consisting of a thin block of wood driven in place and then cut off flush with the faces of the blade. This expands in use by reason of the soaking with water which it receives, and takes up the slightest looseness which might otherwise occur, automatically adjusting the wedge K to hold the tooth firmly. In order to remove the tooth, it is a simple matter to knock out the thin wooden piece and slide the wedge K back sufficiently for the purpose. Even with such teeth when the wheel is first used the arris left on the marble is not perfect, even though the wheel runs true. I have found, however, that by shaping the cutting portion G' of the tooth in the manner shown in Figs. 9 and 10, the arris is improved and made substantially perfect. The arrow indicates the direction of rotation of the wheel, and the tooth is made both thinner and narrower (radially) at its forward end, widening gradually toward the rear end. The effect of this shape is that the tooth emerges from the cut gradually and thus avoids lifting the edge of the marble and injuring the arris. Instead of molding teeth in this shape they can be shaped after being set in the steel blade by running the wheel through a piece of sandstone, which rapidly reduces its forward edge and faces. Where the cutting portion of the wheel is moving downward through the marble there is no tendency to lift the edges, and the value of the tapered shape is not so great.

It is customary to cut on both the forward and the backward movement of the slab under the cutter, and consequently to use the cutting wheel with first one and then the opposite directions of rotation relatively to the marble, so that in order to secure a good arris on both cuts, the teeth should be tapered as described.

Where the teeth are to be located close to each other, leaving only a small piece of the web between, the construction shown in Fig. 15 may be used. The notch in the blade D flares outward and the backing E' of the tooth is correspondingly shaped. The backing is drawn inward and held by a tongue M overlapping or embedded in the blade D and fastened by a rivet N which can be easily driven in or forced out through rivet holes in the blade and tongue respectively.

For a continuous periphery wheel the lower limit of the speed of rotation is determined by the clogging limit of a glazed wheel. At the slowest speeds of rotation relatively to the feed of the marble there is a tendency to jar the marble; so that in the case of toothed wheels and especially with the more fragile marbles care must be taken to preserve a good arris; and the smoothness of running and the condition of the arris are elements also in determining the minimum rate of rotation of the wheel. Thus with the toothed wheel above described the minimum rate of rotation of a fourteen-inch wheel should be between 1,000 and 1,500 revolutions per minute; the rate of feed of the marble being increased proportionately so as to secure a high degree of penetration and to maintain the wheel at its best efficiency. In practice, for example, the machine may be set for the minimum rate of rotation determined by the above considerations and the rate of feed of the marble adjusted for a maximum output, and under such conditions there is a maximum efficiency or ratio of output to power expended.

I do not in this application claim the above described mode of attachment of the teeth, the same being claimed in my prior application, No. 500,250.

What I claim is:—

1. The process of making deep cuts in marble by means of carborundum, which consists in feeding it to a thin wheel having a toothed carborundum periphery and simultaneously rotating said wheel at approximately a minimum rate limited by the clogging of the wheel with particles of marble, so as to remove the marble in as large pieces as possible and to avoid fine grinding of the marble.

2. The process of making deep cuts in marble by means of carborundum, which consists in feeding it to a thin wheel having a toothed carborundum periphery, the particles of carborundum being bonded with a rubber bond, and simultaneously rotating said wheel at approximately a minimum rate limited by the clogging of the wheel with particles of marble, so as to remove the marble in as large pieces as possible and to avoid fine grinding of the marble.

3. The process of making deep cuts in marble by means of carborundum, which consists in feeding it to a thin carborundum wheel rotating at a speed of its cutting periphery below 4500 linear feet per minute.

4. The process of making deep cuts in marble by means of carborundum, which consists in feeding it to a thin cutting wheel having teeth of carborundum bonded with a rubber bond, feeding the marble to said wheel at a maximum rate limited by the strength of the marble and the carborundum and rotating said wheel at approximately a minimum rate limited by the clogging of the wheel with particles of marble, feeding water copiously to the faces of the teeth to clear the particles of marble therefrom, the carborundum being laterally supported by metal extending nearly to the edges of the teeth so as to make them substantially unyielding laterally.

5. The process of making deep cuts in marble by means of carborundum, which consists in feeding it to a thin carborundum wheel, and simultaneously rotating said wheel at approximately a minimum rate limited by the clogging of the wheel and the smoothness of running and the condition of the arris, so as to remove the marble in as large pieces as possible and to avoid fine grinding of the marble.

6. The process of making deep cuts in marble by means of carborundum, which consists in feeding it to a thin carborundum wheel, and simultaneously rotating said wheel at approximately a minimum rate limited by the clogging of the wheel and the smoothness of running and the condition of the arris, so as to remove the marble in as large pieces as possible and to avoid fine grinding of the marble, and feeding the marble to the wheel at a maximum rate limited by the strengths of the marble and the carborundum.

7. An apparatus for making deep cuts in marble including means for feeding the marble, a thin cutting wheel having a carborundum periphery and means for regulating the speed of rotation of said wheel to approximately a minimum rate limited by the clogging of the wheel with particles of marble, so as to remove the marble in as large pieces as possible and to avoid fine grinding of the marble.

8. An apparatus for making deep cuts in marble, including means for feeding the marble, a thin wheel having a toothed carborundum periphery and means for regulating the speed of rotation of said wheel to approximately a minimum rate limited by the clogging of the wheel with particles of marble so as to remove the marble in as large pieces as possible and to avoid fine grinding of the marble.

9. An apparatus for making deep cuts in marble, including means for feeding the marble, a thin wheel having a toothed carborundum periphery, the particles of marble being bonded with a rubber bond, and means for regulating the speed of rotation of said wheel to approximately a minimum rate limited by the clogging of the wheel with particles of marble, so as to remove the marble in as large pieces as possible and to avoid fine grinding thereof.

10. An apparatus for making deep cuts in marble, including means for feeding the marble, a thin wheel having metal webs and having teeth of carborundum mounted on said webs and bonded with a rubber bond and means for regulating the speed of rotation of said wheel to approximately a minimum rate limited by the clogging of the wheels with particles of marble, so as to remove the marble in as large pieces as possible and to avoid fine grinding thereof.

11. An apparatus for making deep cuts in marble, including means for feeding the marble, a thin wheel having a carborundum periphery for cutting the same, means for regulating the speed of feed for the marble to a maximum rate limited by the strength of the marble and the wheel and means for regulating the rotation of the wheel to approximately a minimum rate limited by the clogging of it with particles of marble, so as to take out as large pieces as possible and to avoid fine grinding of the marble.

12. An apparatus for making deep cuts in marble, including a thin wheel having a periphery of carborundum teeth, the carborundum being bounded with an elastic bond and means for feeding the marble to said wheel and rotating said wheel so as to make such deep cuts.

13. An apparatus for making deep cuts in marble, including a thin wheel having a periphery of carborundum teeth, the carborundum being bonded with a rubber bond, and means for feeding the marble to the wheel and rotating said wheel so as to make such deep cuts.

In witness whereof, I have hereunto signed my name in the presence of two subscribing witnesses.

JOHN ROYDEN PEIRCE.

Witnesses:
D. ANTHONY USINA,
FRED WHITE.